United States Patent [19]

Böinghoff et al.

[11] Patent Number: 5,177,686
[45] Date of Patent: Jan. 5, 1993

[54] METHOD FOR DETERMINING THE POSITION OF A SPACE VEHICLE BY MEANS OF STAR ACQUISITION AND STAR IDENTIFICATION

[75] Inventors: Albert Böinghoff, Holzkirchen; Heinrich Herbst, Steinhöring; Luitpold Kaffer, München, all of Fed. Rep. of Germany

[73] Assignee: Messerschmitt Bölkow-Blohm GmbH, Fed. Rep. of Germany

[21] Appl. No.: 603,535

[22] Filed: Oct. 26, 1990

[30] Foreign Application Priority Data

Oct. 26, 1989 [DE] Fed. Rep. of Germany ....... 3935609

[51] Int. Cl.$^5$ ................. G01C 21/02; G01C 21/06
[52] U.S. Cl. .................... 364/459; 364/455; 250/203.6
[58] Field of Search ............... 364/455, 459; 250/203.6, 203.7

[56] References Cited

U.S. PATENT DOCUMENTS

| 4,012,018 | 3/1977 | Lorell et al. | 364/455 X |
|---|---|---|---|
| 4,680,718 | 7/1987 | Sasaki et al. | 364/455 |
| 4,740,681 | 4/1988 | Tsuno | 250/203.6 X |
| 4,746,976 | 5/1988 | Kamel et al. | 364/455 X |
| 4,931,942 | 6/1990 | Garg et al. | 364/459 |
| 4,944,587 | 7/1990 | Harigae | 364/455 X |
| 4,950,881 | 8/1990 | Kaltschmidt | 250/203.6 |
| 5,012,081 | 4/1991 | Jungwirth et al. | 250/203.6 |

Primary Examiner—Parshotam S. Lall
Assistant Examiner—Edward Pipala
Attorney, Agent, or Firm—Evenson, Wands, Edwards, Lenahan & McKeown

[57] ABSTRACT

A method of determining position errors of a space vehicle, which has been rotated from a known starting position into a desired new position, by means of star acquisition and star identification, using a star sensor as well as a star catalogue. Information in the catalog concerning the known positions of, and distances between, a selected group of stars expected to fall within visual field of the star sensor when the space vehicle is in the desired new position, is compared with the same information for selected stars sensed by the star sensor, until a match is found. The position error of the space vehicle is then determined by reference to the deviation between the known and sensed positions of the stars within the selected group.

1 Claim, 1 Drawing Sheet

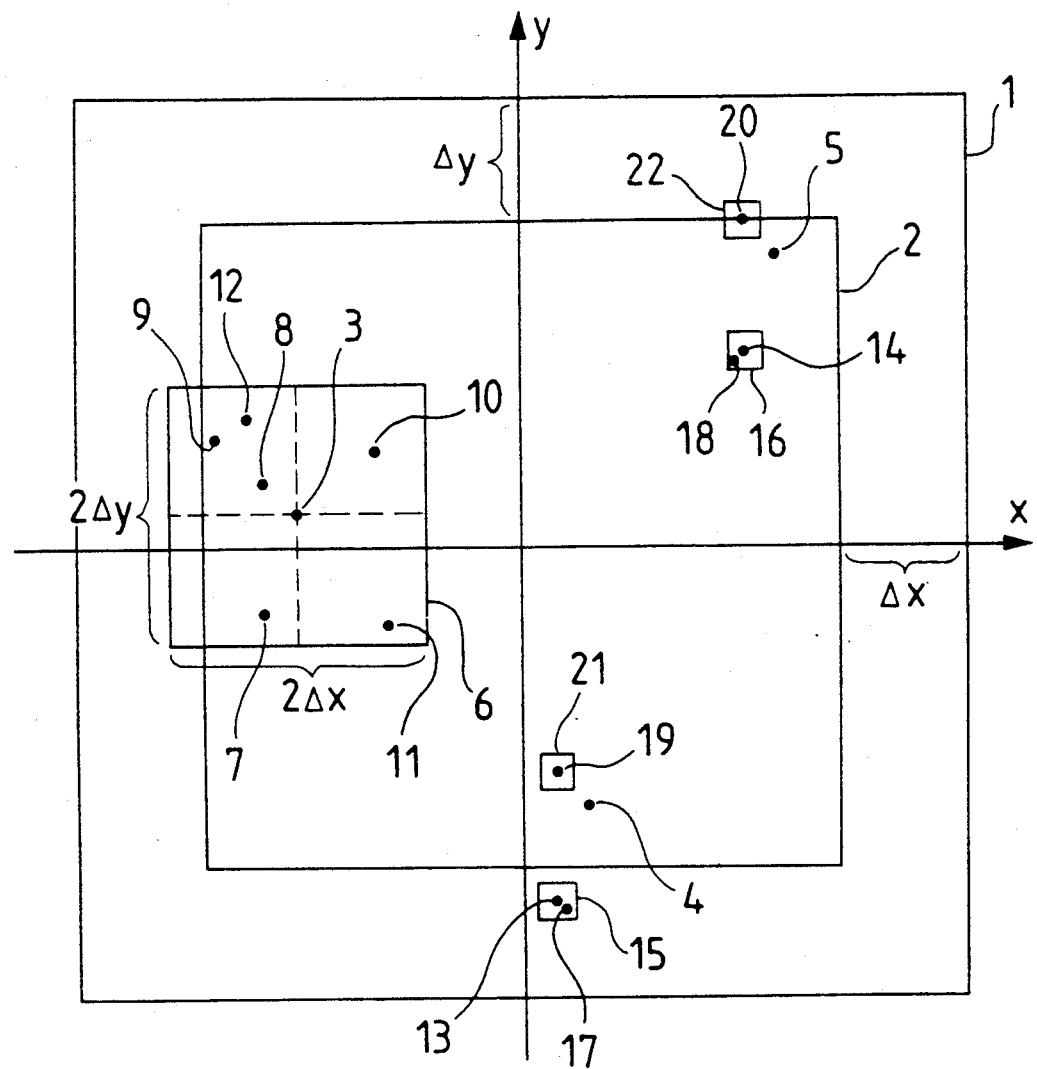

METHOD FOR DETERMINING THE POSITION OF A SPACE VEHICLE BY MEANS OF STAR ACQUISITION AND STAR IDENTIFICATION

BACKGROUND AND SUMMARY OF THE INVENTION

The present invention relates to a method for determining the attitude error of a space vehicle by means of star acquisition and star identification.

The attitude of a space vehicle, particularly a satellite, relative to a spatial system of coordinates must always be precisely known in order for the space vehicle to fully carry out its mission. This is so, for example, when antenna systems, telescopes or star sensors mounted on the satellite must be precisely aligned with specific target areas. Moreover, maneuvers are frequently required in order to carry out a change of alignment or orientation of the satellite in the spatial coordinate systems. Rotational movements of this type may be carried out by means of nozzle systems mounted on the space vehicle, by changing the rotational speed of on board flywheels, or by the interaction of magnetic moments generated in the satellite with exterior magnetic fields. The resulting rotational angles about the three axes of the system of coordinates fixed on the satellite may be measured, for example, by means of high-precision gyroscopes. Thus, based on a precisely known starting orientation, the desired new attitude can be achieved through precise measurement of rotational movements of the space vehicle. However, this determination of the attitude is always characterized by certain errors which depend, in particular on the precision of the measuring instruments that are used.

Star sensors may be used in order to determine attitude errors of this type; that is, differences between the desired and actual new attitude. Such star sensors are conventionally mounted on the space vehicle, and usually have a lens system by means of which a relatively small areal segment of the celestial sphere is imaged on an areal photosensor arrangement, such as a two-dimensional CCD-array. The visual field of the star sensor is determined by the preferably rectangular or square photosensor arrangement in the focal plane of the lens system. This may, for example, be in the order of 5°×5°. In those instances where at least the approximate alignment of the space vehicle is known, it will also be known which segment of the celestial sphere appears in the visual field of the star sensor, that is, which stars are imaged on the photosensor arrangement. It may therefore be predicted which of the brightest stars are to be expected at particular positions in the visual field or on the photosensor arrangement. A two-dimensional, that is, generally rectangular, system of coordinates may be assigned to the visual field or the surface of the photosensor arrangement, the origin of this system of coordinates preferably being in the center of the visual field. By comparing the sensed positions of known stars with their desired positions in the visual field of the star sensor, the attitude error relative to the desired new attitude of the space vehicle can be determined.

It is customary to select a certain number of fixed stars and to compile them into a catalogue of stars, the content of which may be determined by the mission of the space vehicle. The radiation spectrum of the catalogued stars must fall at least partially within the sensitivity range of the photosensor arrangement; furthermore, they must have a certain minimum brightness and maintain this brightness as constantly as possible. In addition, they must not change their position in the celestial sphere and must be so far away that they are imaged as a point. For a catalogue of stars of this type, a system of coordinates may be selected which is centered in the solar system; for example, in the solar center or in the earth center. The catalogue of stars will then contain the respective coordinates with respect to the spatial system of coordinates as well as the respective brightness of the star (magnitude). It is practical to select, if possible, only the brightest stars. However, this may also depend on which segments of the celestial sphere are to be expected in the visual field of the star sensor as a function of the special mission. These segments may differ considerably with respect to the stellar density.

A method of the above mentioned type, in which a star sensor and a catalogue of stars are used, and in which at least three catalogued stars are selected from the catalogue of stars (one being defined as the guide star), is disclosed in U.S. Pat. No. 4,680,718. In those instances in which the initial orientation of the satellite is unknown, or is known only very imprecisely, it cannot be predicted which stars will appear in the visual field of the star sensor. Stored in the catalogue of stars, in addition to data concerning the position of a number of reference stars, is certain information concerning different three-star combinations, the reference star in each case being part of the three-star combination. This information includes the brightness total of these three stars, as well as the surface of the triangle which is in each case defined by them. The same quantities are then determined for respective different combinations of three of the stars observed in the visual field of the star sensor, and are subsequently compared with those stored in the catalogue of stars. This method requires high expenditures with respect to storage space and computing operations as a result of the fact that the orientation of the satellite at first may be arbitrary, and therefore the whole informational content of the star sensor as well as of the stored catalogue of stars must be used.

German patent document DE-OS 14 48 564, also discloses a method of recognizing stellar images in space vehicles where the initial orientation of the satellite is almost unknown. For this purpose, star sensors having very large visual fields are used, for example, with diameters of approximately 44°. Approximately two hundred stars, and as many stellar images, are stored. At least five stars must be visible in the visual field of the star sensor, depending on the orientation of the satellite, and a so-called "central star" is selected approximately in the center of the visual field of the star sensor. The distances between this central star and the other visible stars are then determined and stellar constellations with the same distances are found in the catalogue of stars. If necessary, the angular distances and the brightness of the observed stars are also used. Here also, considerable expenditures are required during the analysis of the star sensor information because of the initially unknown, or only imprecisely known, orientation of the satellite. This method is therefore also not very suitable for a case in which the orientation of the satellite is known fairly accurately before the determination of the position.

When a very precise gyroscope is used for measuring the rotational movement after a star acquisition and identification the following steps are used to measure the catalogued stars appearing in the visual field of the star sensor: First, it is determined for each rotational motion, starting from an almost precisely known initial attitude, which catalogued stars are expected to appear at particular positions in the visual field of the star sensor following completion of the rotation. Expediently, two catalogued stars are selected, and a respective window is placed around their desired positions which corresponds dimensionally to twice the expected maximum attitude error. This window will generally be rectangular, and preferably square. In the case of high-precision gyroscopes and correspondingly low maximum attitude errors, this window is so small that, except for the selected catalogued star, no other star of comparable brightness will be present in it.

The existence of an attitude error will cause the catalogued star to be displaced relative to its expected position. From this difference between the measured actual and the expected position of the catalogued star, conclusions can be drawn concerning an attitude error of the space vehicle in two dimensions. In this case, the measurement may be performed in such a manner that the output signals of only the photosensors located within the selected window are used for the analysis. By mean of the comparison of the output signals of these individual sensors according to defined methods, the position of the respective brightest star can be easily determined within the window.

This simple-appearing method of operation, however, requires the use of high-precision (and therefore very expensive) measuring instruments, particularly gyroscopes, since the use of less precise measuring instruments will yield a larger attitude error, and the window placed around the desired position of the selected catalogued star must therefore be enlarged correspondingly in its dimensions s that this catalogued star will be reliably situated within the window. Moreover, starting from a certain relatively larger window size, it is unavoidable that, in addition to the selected catalogued star, other stars of comparable brightness also appear in the window. The selected catalogued star can then no longer be easily identified.

It is therefore an object of the present invention to provide a method of the generic type described above which, on the one hand, does not require the use of high-precision and therefore expensive measuring instruments for the determination of the rotational angle covered during the rotational movement and, on the other hand, can be carried out with minimal storage and computing expenditures.

Other objects, advantages and novel features of the present invention will become apparent from the following detailed description of the invention when considered in conjunction with the accompanying drawing.

BRIEF DESCRIPTION OF THE DRAWING

FIG. 1 is a schematic representation of the visual field of a star sensor with a pertaining system of coordinates x/y, which illustrates the method according to the invention.

DETAILED DESCRIPTION OF THE DRAWING

Referring to FIG. 1, the visual field of a star sensor is depicted as a square but may, for example, also be rectangular. The visual field 1 is determined by the dimensions of a photosensor arrangement situated in the image plane (focal plane) of the lens system of the image sensor. This photosensor arrangement is preferably an areal CCD-array which comprises a line- and column-shaped arrangement of individual photosensors which are arranged closely next to one another. For example, $288 \times 385$ individual photosensors respectively are arranged next to one another in the x- and y-direction and each requires an area of $0.022 \times 0.022$ mm$^2$. As a whole, the CCD-array will then have dimensions of $6.3 \times 38.5$ mm$^2$. In the case of a focal length of 82.6 mm of the lens system, this corresponds to an angular visual field of $5.9° \times 4.4°$.

The maximum attitude error, $\Delta x$ and $\Delta y$, which is to be expected after the termination of a rotational movement depends on the quality of the measuring instruments as well as the duration and the angular speed of the rotation, and is usually the same in the x- and the y-direction. Thus, from the edges of the visual field 1, edge areas may be determined which, in their width, correspond to these maximum attitude errors $\Delta x$ and $\Delta y$ as shown in FIG. 1. This results in a reduced visual field 2 which is diminished in its area in comparison to the visual field 1.

Now three catalogued stars are selected, which are to be expected at positions 3, 4 and 5 within the reduced visual field 2 when the space vehicle is aligned precisely in the desired new attitude. One of these catalogued stars, for example the one situated in the desired position 3, is defined as the guide star. The selection of these three catalogued stars may be made before the start of the mission of the space vehicle, if its desired orientation is determined in advance. For example, a satellite carrying a telescope must be positioned in such a manner that the telescope is aimed at a certain region of the celestial sphere, and it can be determined in advance, therefore, which segment of the celestial sphere will appear in the visual field of the star sensor. The selection of the three catalogued stars in the reduced visual field according to the above-mentioned criteria may then be made in such a manner that, due to their brightness, these stars stand out well from their environment and form a clearly distinguishable geometric configuration. For each intended new orientation of the space vehicle, such a configuration of selected catalogued stars may be fed to a memory carried on board the space vehicle. The number of three selected catalogued stars is the minimum number required for carrying out the method according to the invention; however, four or more catalogued stars may also be selected within the reduced visual field, thereby further reducing the risk of a faulty determination, which is very slight in all events.

After the space vehicle reaches its new attitude following a rotational movement, the positions of the three brightest stars 7, 8 and 9 are determined by analyzing the output signals of the photosensor arrangement within a first window 6 which corresponds dimensionally to twice the expected maximum attitude error. The window 6 is centered around the desired position 3 of the guide star and is expediently aligned with its edges parallel to the x and y axes. If the attitude error in both coordinate directions is equally large, the first window 6 is selected to be square, specifically with a side length $2\Delta x$ which is twice as large as the maximally expected attitude error $\Delta x$. As a result, despite the attitude error the guide star 3 reliably appears in the selected first window 6. The determination of the brightest stars within the first window 6 is made so that the guide star is definitely among them. That is, from the start, the guide star had been selected such that, in the region in question, it is the brightest or at least one of the brightest stars. Generally, it will therefore be sufficient to determine in the first window 6, the positions 7, 8 and 9 of the three brightest stars.

The determination of the brightest stars in the window 6 may also be made in three successive search phases; that is, in each phase the brightest star is determined, and is then disregarded in the subsequent phase. Thus, in sequence the three brightest stars in the window 6 are determined in descending order of brightness, which may be the mentioned positions 7, 8 and 9. Subsequently, the first window 6 may be divided into four smaller square windows 6a–6d, each being one fourth of the first window 6, and in each of these smaller windows the respective brightest star is determined. For this purpose, the smaller windows in which the previously determined brightest star is situated is not taken into account. For example, if the window 6c is the one in which is situated the previously determined position 7 of the brightest star in the first window 6, the stars which are determined in this manner in the other three smaller windows 6a, 6b as well as 6d are imaged at positions 10, 11 and 12. (It is not necessary, however, to determine the latter three positions 10, 11 and 12 if the guide star, as indicated by the further method of operation, is already among the stars corresponding to the first three determined positions 7, 8 and 9.)

Having completed the identification of brightest stars a described above, the position of the guide star and the attitude error of the space vehicle, are determined according to the invention by the following process: A position deviation relative to the desired position 3 of the guide star is determined for a first one (generally, the brightest) of the selected stars (for example, position 7) within the window 6, assuming, for the time being, that this first star is in fact the guide star. (The desired position 3 of the guide star itself is known and the coordinates of the positions of the predetermined brightest stars, immediately after being determined, have been expediently fed into a memory located on board the space vehicle, whereupon they may then be retrieved by an on board computer, for further analysis. The position deviation may thus be computed in both dimensions x and y comparing the sensed coordinates of the selected brightest star (position 7) with the desired position 3 of the guide star.)

Next, tentative corrected desired positions 13 and 14 are determined for the remaining two selected catalogued stars, based on the thus determined position deviation, by making corresponding adjustments from the respective desired positions 4 and 5. The output signals of the photosensor arrangement within two-dimensional second windows 15 and 16 centered around the respective corrected desired position 13 and 14 is then analyzed, and the position of the respective brightest star is determined. In this case, the dimensions of the two second windows 15 and 16 are selected to be just small enough that, while taking into account the stellar density existing in the visual field 1 of the star sensor, no more than on star that is comparable in terms of brightness to the catalogued stars can be present in each case. It is assumed that the brightest stars determined in the two second windows 15 and 16 are situated at positions 17 and 18.

The distances between positions 17 and 18 of the two brightest stars in the second windows 15 and 16 are then determined, both with respect to one another and relative to position 7 of the first star. These distances are compared with the respective distances between the known desired positions 4, 5 and 3, preferably in the on board computer by retrieving the coordinates of the mentioned desired positions present in the memory. If the distances that are compared with one another coincide, it is concluded the first star selected within the first window 6 is actually the guide star because it will then, together with the stars determined in the second windows 15 and 16, form exactly that geometrical constellation which corresponds to the selected three catalogued stars (desired positions 3, 4 and 5).

In the present example, this condition is not met because the determined positions 17, 18 and 7 do not correspond to the geometrical configuration of the desired positions 4, 5 and 3 of the three selected catalogued stars. Therefore, another star (other than position 7) is selected from among the stars (positions 7 to 9 and, in addition, 10 to 12) determined within the first window 6, and the process is repeated. That is, it is now assumed that this star is the guide star. For this purpose, it is expedient to proceed here in the sequence of decreasing brightness.

For the purpose of illustration, it is assumed that the second brightest star within the first window 6 is the star which is imaged at position 8. Starting from this position 8, its deviation from the desired position 3 of the guide star is now determined, and new corrected desired positions 19 and 20 are subsequently assigned to the desired positions 4 and 5 of the two remaining catalogued stars, again by making an adjustment corresponding to this deviation. Second windows 21 and 22, in turn, are placed around these desired positions 19 and 20, in which the respective brightest star is determined. If the star corresponding to position 8 is actually the guide star, the brightest stars determined in the second windows 21 and 22 will be situated approximately in the window centers, that is, at positions 19 and 20. During the subsequent comparison, the distances of positions 19 and 20 from one another as well as from position 8, are found to coincide with the corresponding distances to the desired positions 4, 5 and 3. In this case, the sensed position of the searched three catalogued stars were situated at positions 19, 20 and 8. The attitude error of the space vehicle may then be determined from the difference between the positions 19 and 20 of the two brightest stars defined in the two second windows 21 and 22, and the respective desired positions 4 and 5 of the remaining two catalogued stars which are not the guide star. Likewise, this attitude error can also be determined from the position deviation between the actual position 8 and the desired position 3 of the guide star.

If it is found that the second star (position 8) defined within the first window 6 is not yet the guide star, the described method must be repeated using a different one of the stars defined within the first window 6.

The method according to the invention makes it possible to carry out the star acquisition and identification rapidly and reliably by means of the star sensor for the purpose of determining attitude errors of the space vehicle which occurred after rotational movements. Only relatively small areas of the whole visual field of the star sensor are required for the arithmetic analysis of the output signals of the photosensor arrangement, and it is thus unnecessary to analyze the image information of the whole visual field according to where a star constellation is situated which corresponds to that of the three selected catalogued stars. This method also has the advantage that it is unnecessary to use measuring instruments, specifically gyroscopes, having a high degree of precision for the determination of the rotational angles resulting from the rotational movement. Attitude errors in the range of up to 1° may be permitted around any axis. The attitude error can nevertheless be determined with high accuracy, so that a corresponding attitude correction may be carried out subsequently. As few as three catalogued stars are sufficient for the new orientation of the space vehicle.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A method for determining the attitude error of a space vehicle by means of star acquisition and identification, after having rotated the space vehicle from a known starting attitude into a desired new attitude using a star sensor on board the space vehicle which has a lens system as well as a two-dimensional photosensor arrangement situated in the focal plane of this lens system and defining a visual field of the star sensor, as well as using a catalogue of stars which contains the known positions of a number of stars relative a system of coordinates, wherein the attitude error is determined by the following steps:

a) defining a reduced visual field which is decreased with respect to the visual field of the star sensor by edge areas having width which corresponds to a maximum expected attitude error following completion of said rotation;
   b) selecting from along the catalogued stars which, in a case of a precise alignment of the space vehicle in the desired new attitude, are expected to be within the reduced visual field, at least three reference stars in known positions, one of which is designated as a guide star;
   c) determining expected positions within the reduced visual field for each of said reference stars, based on their known positions relative to the system of coordinates and on the desired new attitude of the space vehicle;
   d) determining the positions of the respective brightest stars within a two-dimensional first window having dimensions corresponding to twice the maximum expected attitude error and centered around the expected position of the guide star, by analyzing the output signals of the photosensor arrangement,
   e) determining the deviation of the position of a first one of the stars defined in step d) relative to the expected position of the guide star,
   f) determining corrected expected positions for the remaining two selected catalogued stars by applying an adjustment which corresponds to the deviation determined in step e)
   g) determining the position of the brightest star within a two-dimensional second window centered around each of the corrected expected positions, by analyzing the output signals of the photosensor arrangement, the dimensions of the second windows being selected such that no more than one star comparable in brightness to the catalogued stars can be present in it, taking into account stellar density present in the visual field of the star sensor,
   h) determining the distances of the positions of the thus determined brightest stars from one another and from the position of the guide star and comparing said positions with the respective distances between the known positions, of the stars selected in step b);
   i) if the distances which are compared with one another coincide, the attitude error of the space vehicle is determined from the difference between the positions of the two brightest stars defined in the two second windows and the respective expected positions of the remaining two catalogued stars,
   j) and if the distances which are compared with one another do not coincide, steps e) to i) are carried out on the basis of a different one of the stars defined within the first window.

* * * * *